United States Patent
Nakamura et al.

(10) Patent No.: US 11,136,117 B2
(45) Date of Patent: Oct. 5, 2021

(54) WING FLAPPING APPARATUS

(71) Applicant: Murata Manufacturing Co., Ltd., Nagaokakyo (JP)

(72) Inventors: Kazutaka Nakamura, Nagaokakyo (JP); Masanori Kato, Nagaokakyo (JP); Masaki Hamamoto, Sakai (JP); Tomoyuki Miyake, Sakai (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 802 days.

(21) Appl. No.: 15/964,752

(22) Filed: Apr. 27, 2018

(65) Prior Publication Data

US 2018/0244382 A1 Aug. 30, 2018

Related U.S. Application Data

(63) Continuation of application No. PCT/JP2016/082448, filed on Nov. 1, 2016.

(30) Foreign Application Priority Data

Nov. 4, 2015 (JP) .............................. JP2015-216603

(51) Int. Cl.
*B64C 33/02* (2006.01)
*B64C 13/34* (2006.01)

(52) U.S. Cl.
CPC .............. *B64C 33/02* (2013.01); *B64C 13/34* (2013.01)

(58) Field of Classification Search
CPC ....... B64C 33/00; B64C 33/02; B64C 33/025; B64C 13/34; A63H 27/008
(Continued)

(56) References Cited

U.S. PATENT DOCUMENTS 3,539,063 A * 11/1970 Masura .................. A63H 17/12
414/694
8,205,823 B2 6/2012 Keennon et al.
(Continued)

FOREIGN PATENT DOCUMENTS

CN 205574276 U 9/2016
FR 376962 A * 8/1907 ............. B64C 33/00
(Continued)

OTHER PUBLICATIONS

International Search Report issued for PCT/JP2016/082448, dated Dec. 13, 2016.
(Continued)

*Primary Examiner* — Nicholas McFall
*Assistant Examiner* — Terri L Filosi
(74) *Attorney, Agent, or Firm* — Arent Fox LLP

(57) ABSTRACT

A wing flapping apparatus including a frame body, a motive power source and a power transmission mechanism that transmits motive power generated in the motive power source to drive a wing unit. Moreover, the power transmission mechanism includes a slider that linearly reciprocates in an X-axis direction upon reception of the motive power transmitted from the motive power source, and a rotating body that reciprocates in a rotation direction upon reception of the motive power transmitted from the slider. Furthermore, the wing unit swings such that its distal end moves approximately in the X-axis direction as the rotating body reciprocates in the rotation direction. In this aspect, linear reciprocation of the slider and swinging of the wing unit in the X-axis direction are opposite in direction to each other.

12 Claims, 12 Drawing Sheets

(58) Field of Classification Search
USPC .......................................................... 446/35
See application file for complete search history.

(56) References Cited

U.S. PATENT DOCUMENTS

| | | |
|---|---|---|
| 8,210,471 B2 | 7/2012 | Keennon et al. |
| 9,950,790 B2 | 4/2018 | Keennon et al. |
| 9,957,044 B2 | 5/2018 | Keennon et al. |
| 2010/0308160 A1 | 12/2010 | Keennon et al. |
| 2012/0048994 A1 | 3/2012 | Keennon et al. |
| 2013/0032013 A1 | 2/2013 | Mikami et al. |
| 2013/0168493 A1 | 7/2013 | Keennon et al. |
| 2013/0320133 A1 | 12/2013 | Ratti et al. |
| 2015/0008279 A1 | 1/2015 | Keennon et al. |
| 2015/0115097 A1 | 4/2015 | Keennon et al. |
| 2017/0183092 A1 | 6/2017 | Keennon et al. |

FOREIGN PATENT DOCUMENTS

| | | | |
|---|---|---|---|
| JP | 2009178592 A | 8/2009 | |
| JP | 2011195050 A | 10/2011 | |
| JP | 2012529398 A | 11/2012 | |

OTHER PUBLICATIONS

Written Opinion of the International Searching Authority issued for PCT/JP2016/082448, dated Dec. 13, 2016.

\* cited by examiner

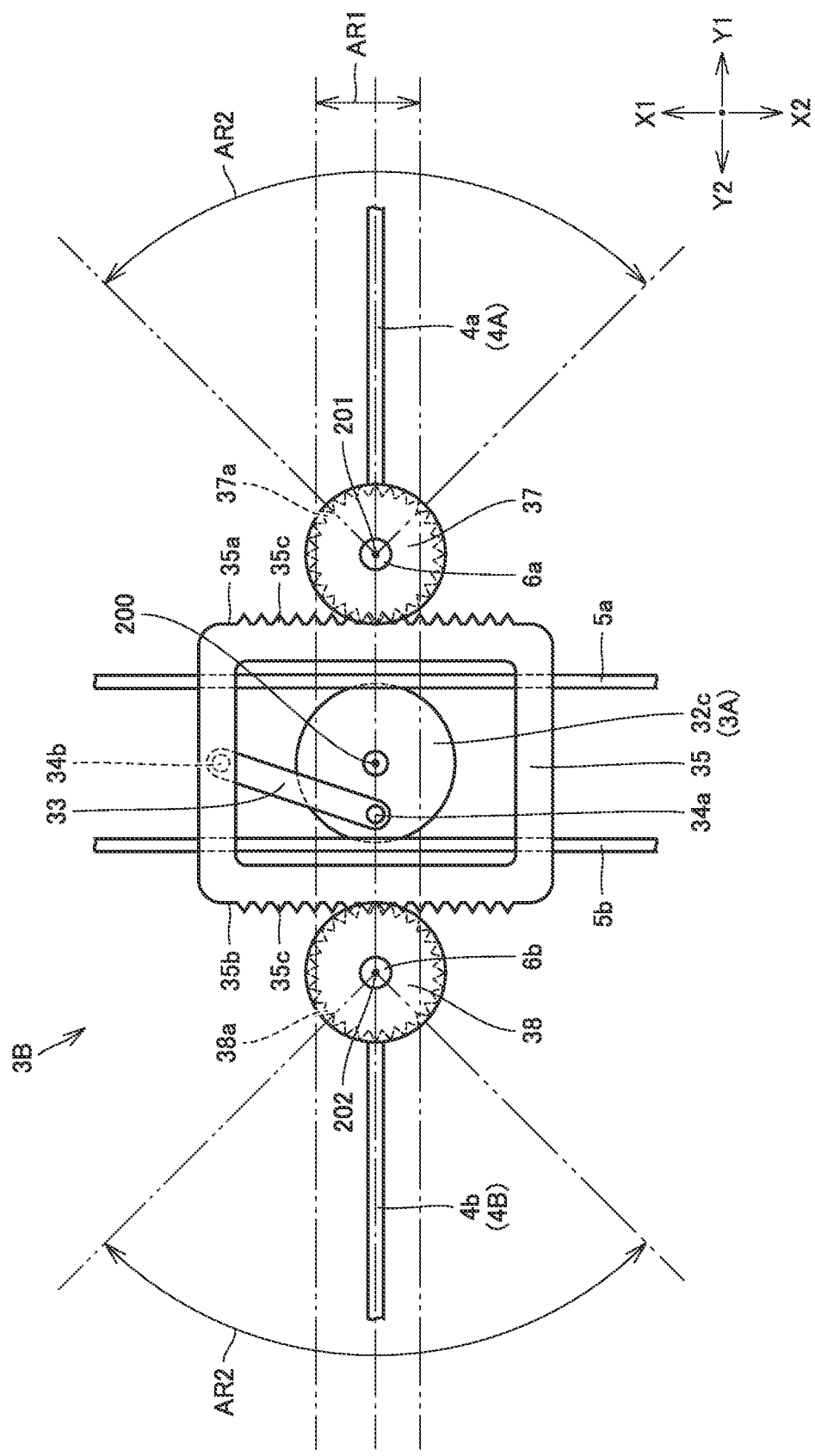

WING FLAPPING APPARATUS

CROSS REFERENCE TO RELATED APPLICATIONS

The present application is a continuation of PCT/JP2016/082448 filed Nov. 1, 2016, which claims priority to Japanese Patent Application No. 2015-216603, filed Nov. 4, 2015, the entire contents of each of which are incorporated herein by reference.

TECHNICAL FIELD

The present disclosure relates to a wing flapping apparatus that achieves levitation force by swinging wing units driven by a motive power source installed in a frame body.

BACKGROUND

Generally, existing wing flapping apparatuses have a frame body provided with a wing unit on each of its port side and starboard side. Each wing unit is driven by a motive power source installed in the frame body. At this time, each wing unit, which has a proximal end located on the frame body side and a distal end located on the opposite side of the proximal end, swings such that the distal end moves approximately in the front-rear direction about the proximal end as the center of rotation.

For example, Japanese Patent National Publication No. 2012-529398 (hereinafter "PTD 1") discloses, in FIG. 9, a wing flapping apparatus configured such that a rocker arm is attached at the proximal end of a mast having a wing unit attached thereto, in which the rotational motion output from the rotary motor serving as a driving source is converted by a crank into a reciprocating linear motion, thereby causing the rocker arm to be periodically pushed and pulled, to allow the rocker arm to drive the mast, so that the wing unit swings in the front-rear direction.

In the case of the wing flapping apparatus in PTD 1, inertial force is generated in accordance with swinging of the wing unit, thereby generating periodical vibrations in the frame body. Due to the generated vibrations, not only the flight attitude of the wing flapping apparatus becomes unstable, but also smooth swinging of the wing unit is inhibited to thereby increase fluctuations of the load applied to the motive power source. Accordingly, when no measures are taken against the above-described situation, the motion efficiency of the wing flapping apparatus significantly deteriorates.

Furthermore, in the wing flapping apparatus of PTD 1, the wing unit receives air resistance when the wing unit swings. The magnitude of this air resistance is proportional to the product of the drag coefficient defined by the angle of attack and the square of the wing velocity. Thus, the fluctuations of the air resistance are transmitted as fluctuations of the load to the driving source through a power transmission mechanism that connects the wing unit and the motive power source. Accordingly, when no measures are taken against also the above-described situation, large fluctuations of the load are applied to the driving source, with the result that the motion efficiency of the wing flapping apparatus also significantly deteriorates.

SUMMARY OF THE INVENTION

Thus, the present disclosure has been made in light of the above-described problems, and aims to provide a wing flapping apparatus improved in motion efficiency.

Accordingly, a wing flapping apparatus is disclosed according to a first exemplary aspect includes a frame body; a motive power source installed in the frame body; a wing unit; and a power transmission mechanism configured to transmit motive power generated in the motive power source to the wing unit. The wing unit is configured to be driven by the power transmission mechanism. Moreover, the power transmission mechanism includes a slider movably supported by the frame body, with the slider being configured to linearly reciprocate in a first direction upon reception of the motive power transmitted from the motive power source, and a rotating body rotatably supported by the frame body, with the rotating body being configured to, upon reception of the motive power transmitted from the slider, reciprocate in a rotation direction about a rotation axis as a center of rotation, with the rotation axis extending in a second direction that is orthogonal to the first direction. The wing unit has a proximal end and a distal end, with the proximal end being fixed to the rotating body, to allow the wing unit to swing such that the distal end moves approximately in the first direction as the rotating body reciprocates in the rotation direction. In the wing flapping apparatus according to the first exemplary aspect, linear reciprocation of the slider and swinging of the wing unit in the first direction are opposite in direction to each other.

According to an aspect of the first exemplary embodiment, the power transmission mechanism may further include an elastic belt partially fixed to the slider, in which a portion of the elastic belt that is not fixed to the slider is wound around the rotating body, to allow the rotating body to reciprocate in the rotation direction as the slider linearly reciprocates.

In the above-described first exemplary embodiment, it is preferable that the rotating body is formed of a gear and the elastic belt is formed of a toothed belt configured to engage with the gear.

In a second exemplary embodiment of the wing flapping apparatus according to the first exemplary aspect, the slider and the rotating body may contact each other, to allow the rotating body to reciprocate in the rotation direction as the slider linearly reciprocates.

In the above-described second exemplary embodiment, it is preferable that the rotating body is formed of a gear and the slider is formed of a toothed slider configured to engage with the gear.

Moreover, a wing flapping apparatus according to a second exemplary aspect of the present disclosure includes a frame body; a motive power source installed in the frame body; a first wing unit and a second wing unit; and a power transmission mechanism configured to transmit motive power generated in the motive power source to the first wing unit and the second wing unit. The first wing unit and the second wing unit are configured to be driven by the power transmission mechanism. Moreover, the power transmission mechanism includes a slider movably supported by the frame body, the slider being configured to linearly reciprocate in a first direction upon reception of the motive power transmitted from the motive power source, and a first rotating body and a second rotating body that are rotatably supported by the frame body, each of the first rotating body and the second rotating body being configured to, upon reception of the motive power transmitted from the slider, reciprocate in a rotation direction about a rotation axis as a center of rotation, the rotation axis extending in a second direction that is orthogonal to the first direction. The first rotating body and the second rotating body are arranged side by side in a third direction that is orthogonal to the first direction and the second direction. In addition, the first wing unit has a proximal end and a distal end, with the proximal end being fixed to the first rotating body such that the distal end is located on a side opposite to a side where the second rotating body is located, when seen from the first rotating body. Further, the second wing unit has a proximal end and a distal end, with the proximal end being fixed to the second rotating body such that the distal end is located on a side opposite to a side where the first rotating body is located, when seen from the second rotating body. The first wing unit and the second wing unit are configured to swing such that the distal end of the first wing unit and the distal end of the second wing unit synchronously move approximately in the first direction as the first rotating body reciprocates in the rotation direction and the second rotating body reciprocates in the rotation direction, respectively. In the wing flapping apparatus according to the second exemplary aspect, movement of the slider in the first direction and swinging of each of the first wing unit and the second wing unit in the first direction are opposite in direction to each other.

According to the exemplary aspects of the present disclosure, a wing flapping apparatus is provided with improved in motion efficiency compared with conventional wing flapping apparatuses.

BRIEF DESCRIPTION OF DRAWINGS

FIG. 12 is a schematic top view for illustrating the configuration and the operation of a motion conversion unit of the wing flapping apparatus in the third exemplary embodiment.

DETAILED DESCRIPTION OF EMBODIMENTS

Figure 1:
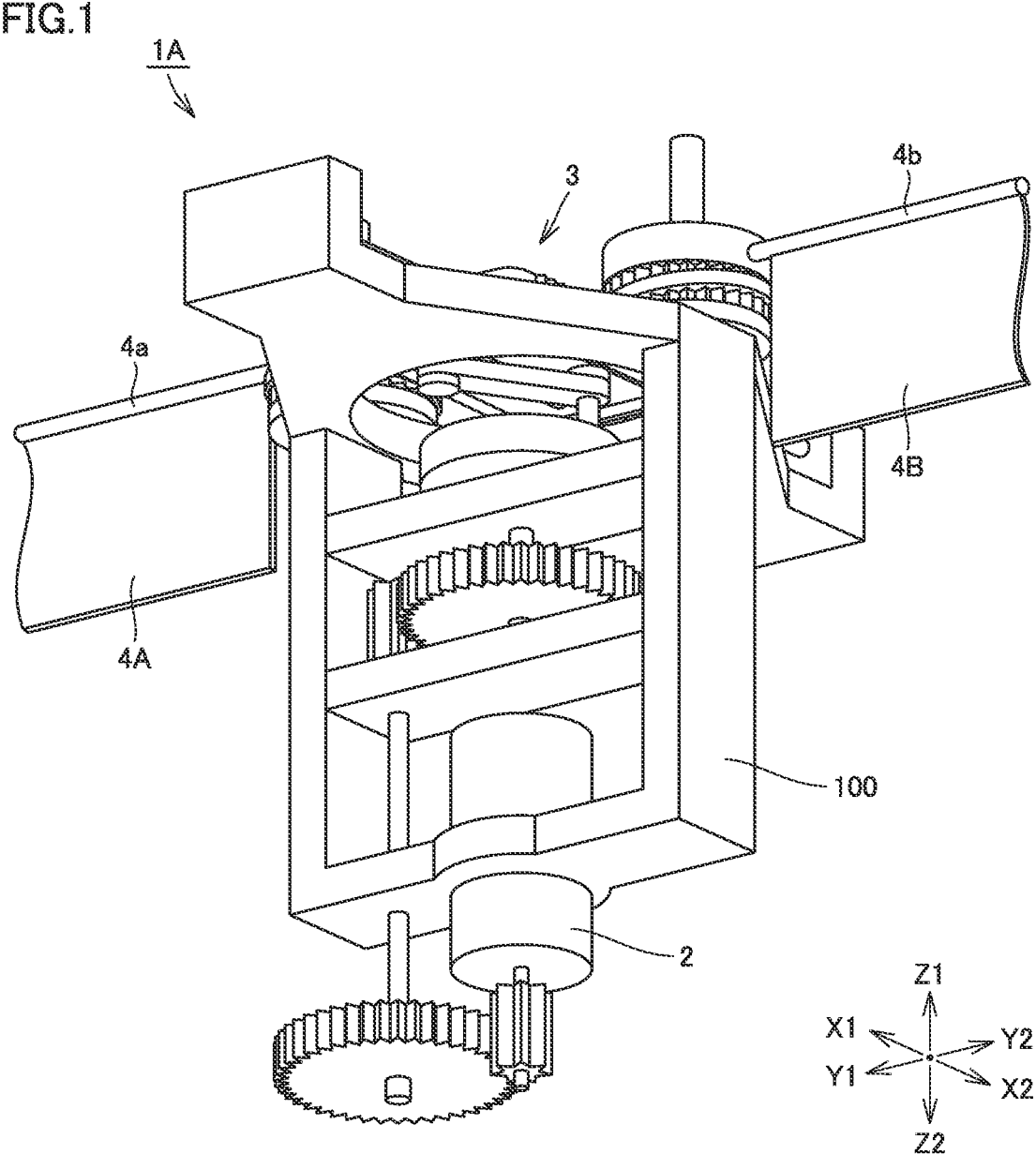
FIG. 1 is a schematic perspective view of a main part of a wing flapping apparatus in the first exemplary embodiment.

Exemplary embodiments of the present disclosure will be hereinafter described in detail with reference to the accompanying drawings. In the exemplary embodiments described below, the same or corresponding components are designated by the same reference characters, and description thereof will not be repeated.

First Embodiment

Figure 2:
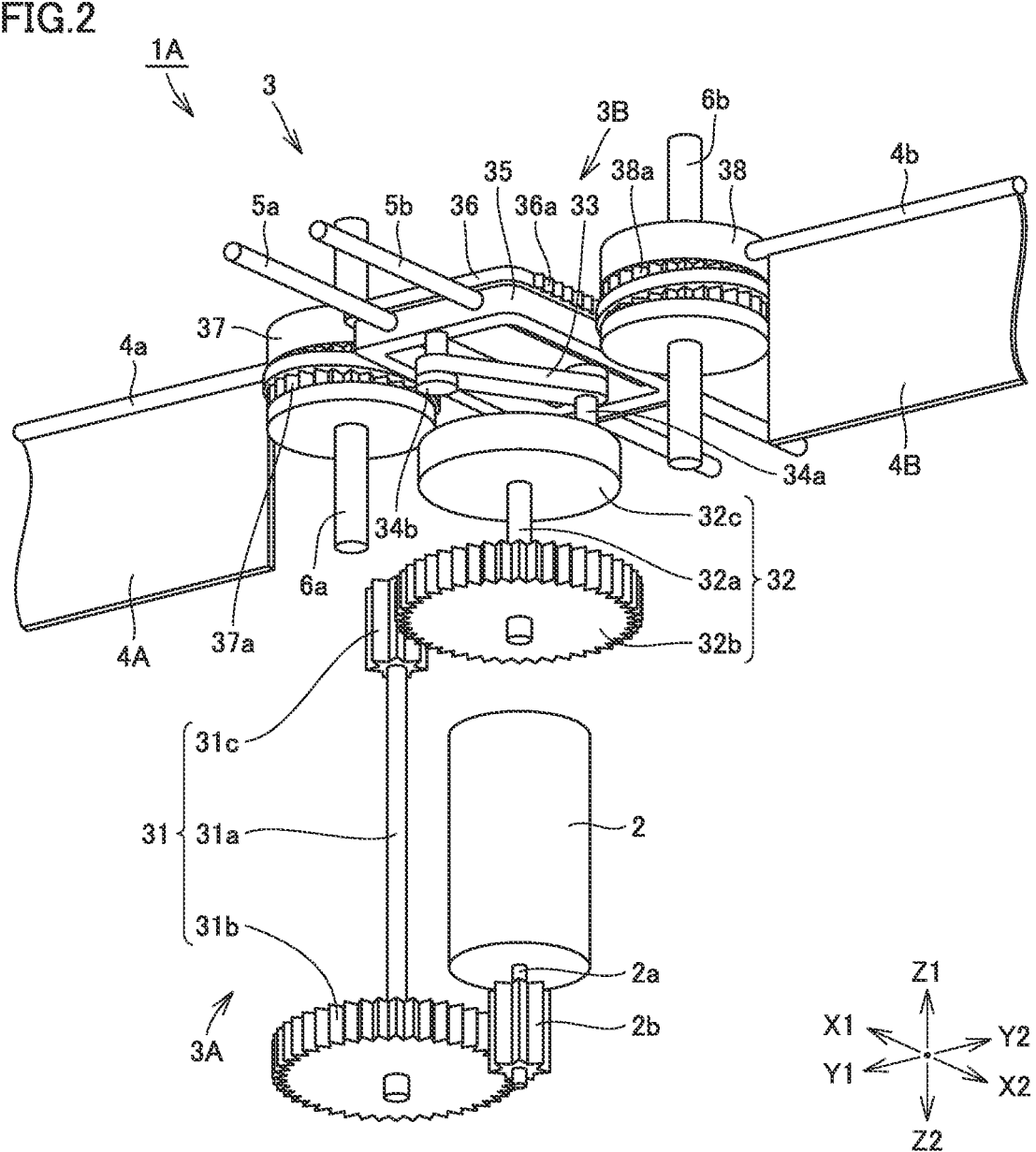
FIG. 2 is a schematic perspective view of a main part of the wing flapping apparatus without showing a frame body in the first exemplary embodiment.
Figure 3:
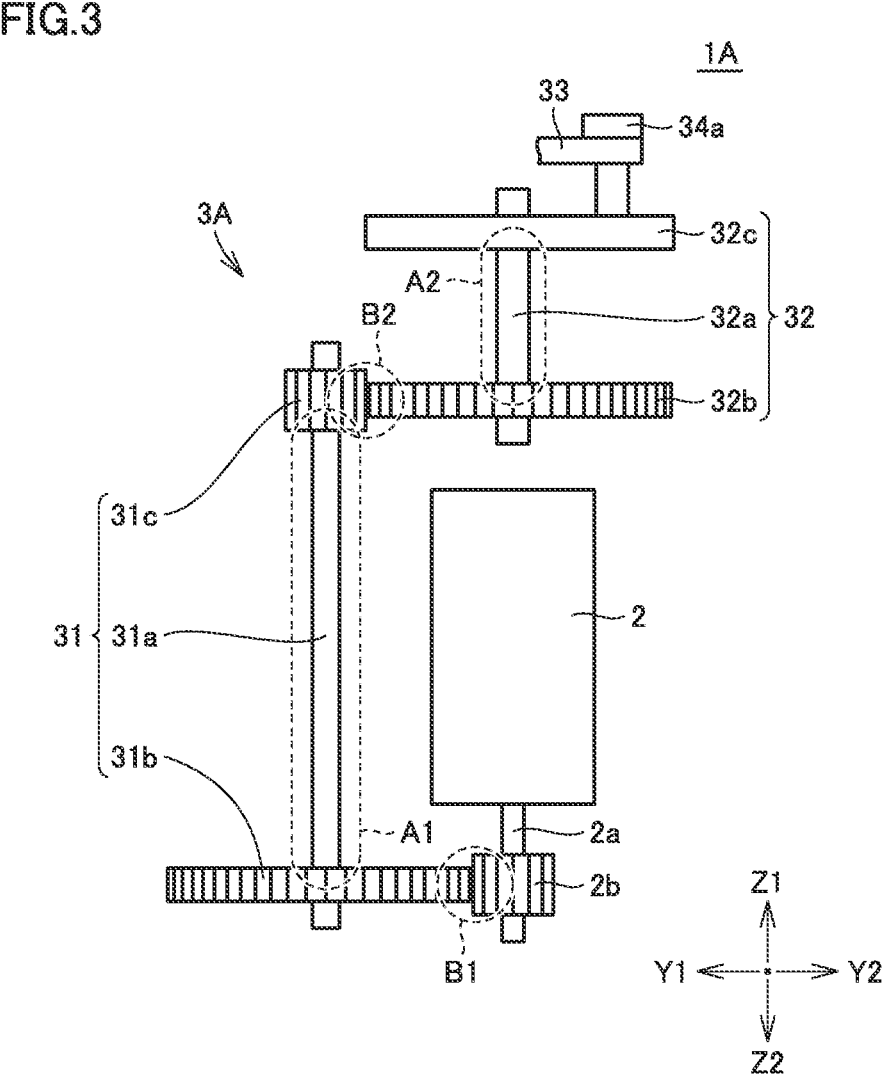
FIG. 3 is a schematic front view for illustrating the configuration and the operation of a rotational motion transmission unit of the wing flapping apparatus in the first exemplary embodiment.
Figure 4:
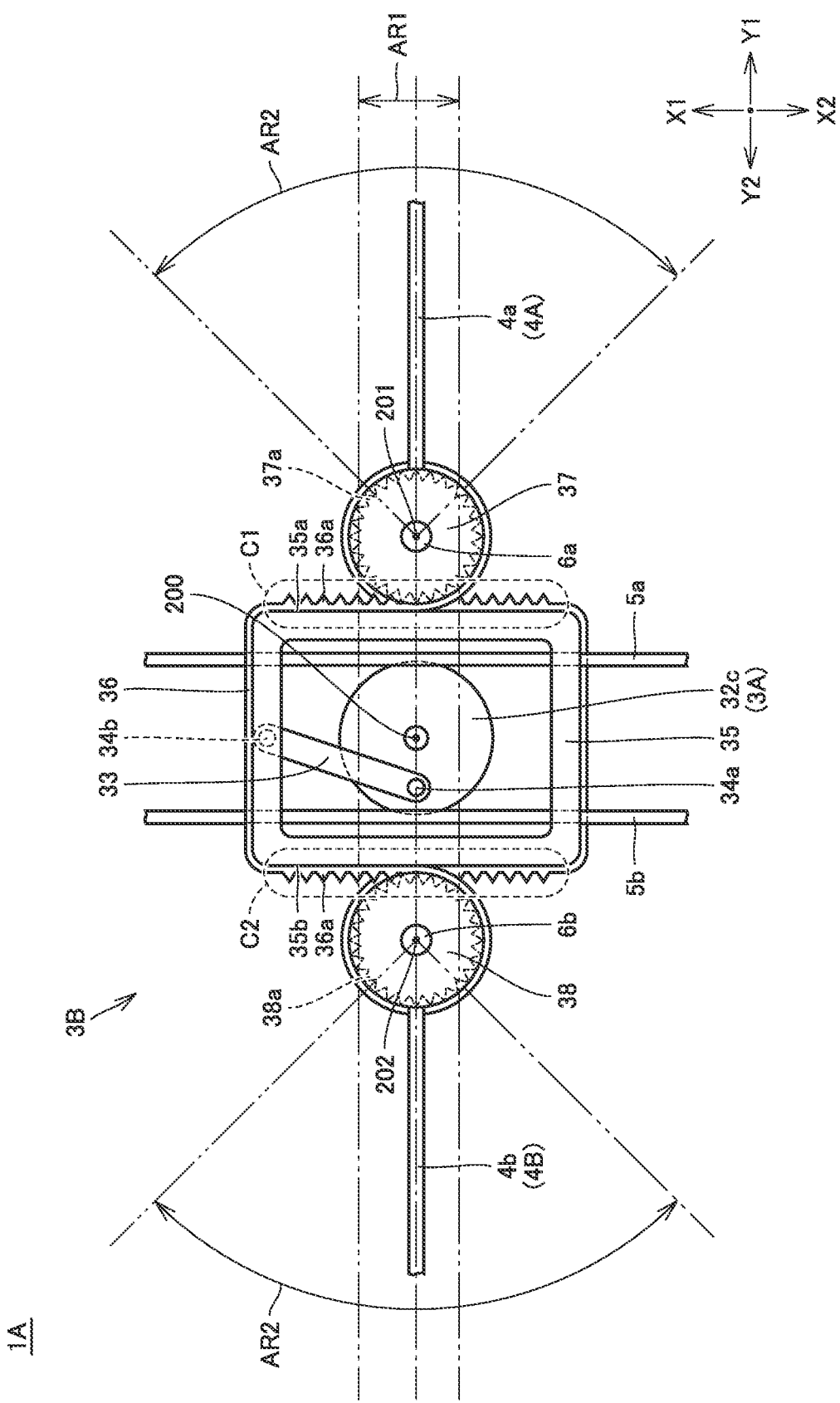
FIG. 4 is a schematic top view for illustrating the configuration and the operation of a motion conversion unit of the wing flapping apparatus in the first exemplary embodiment.

FIG. 1 is a schematic perspective view of a main part of a wing flapping apparatus in the first exemplary embodiment. FIG. 2 is a schematic perspective view of this main part without showing a frame body. FIG. 3 is a schematic front view for illustrating the configuration and the operation of a rotational motion transmission unit shown in FIG. 2. FIG. 4 is a schematic top view for illustrating the configuration and the operation of the motion conversion unit shown in FIG. 2. First, referring to FIGS. 1 to 4, the configuration and the schematic operation of a wing flapping apparatus 1A in the present embodiment will be hereinafter described.

As shown in FIG. 1, wing flapping apparatus 1A mainly includes: a frame body 100; a rotary motor 2 as a motive power source installed in frame body 100; a power transmission mechanism 3 configured to transmit motive power generated in rotary motor 2; a first wing unit 4A and a second wing unit 4B serving as a pair of wing units and driven by power transmission mechanism 3; and a battery (not shown) configured to supply electric power to the above-described rotary motor 2. As shown in FIG. 2, power transmission mechanism 3 includes a rotational motion transmission unit 3A and a motion conversion unit 3B.

As shown in FIGS. 1 and 2, the front-rear direction, the right-left direction, and the up-down direction of wing flapping apparatus 1A are defined as an X-axis, a Y-axis, and a Z-axis, respectively. The direction frontward of wing flapping apparatus 1A and the direction rearward of wing flapping apparatus 1A are defined as an X1 direction and an X2 direction, respectively. The direction rightward of wing flapping apparatus 1A and the direction leftward of wing flapping apparatus 1A are defined as a Y1 direction and a Y2 direction, respectively. The direction upward of wing flapping apparatus 1A and the direction downward of wing flapping apparatus 1A are defined as a Z1 direction and a Z2 direction, respectively. The following description of the exemplary embodiments will be made based on the directions as defined above.

As shown in FIG. 1, frame body 100 is provided as a member including a main body of wing flapping apparatus 1A and formed by installation therein of rotary motor 2, power transmission mechanism 3 and the battery that are described above. Frame body 100 is formed of a frame-shaped skeletal structure, for example. In addition to this, frame body 100 may include a cover for covering the frame-shaped skeletal structure.

As shown in FIGS. 1 to 3, rotary motor 2 is disposed in the lower portion of wing flapping apparatus 1A and installed in frame body 100 as described above. Rotary motor 2 includes an output shaft 2a configured to output rotational motion. In the exemplary aspect, output shaft 2a is formed of a metal-made shaft. Output shaft 2a is disposed to extend in the Z-axis direction and has an end to which a gear 2b is fixed. Gear 2b rotates together with output shaft 2a in accordance with rotation of output shaft 2a about the axis line.

Generally, rotary motor 2 is controlled by a controller (e.g., a microcontroller, computer processor, or the like) to which a control instruction is given by a user or an automated algorithm. However, since the details of this control are not directly related to the subject of the exemplary embodiments, the details will not be described herein for simplification of explanation. Thus, the present embodiment will be described based on the condition that rotary motor 2 is directly driven by the electric power received from the above-mentioned battery (not shown).

As shown in FIG. 1, rotational motion transmission unit 3A includes a first transmission member 31 and a second transmission member 32. Each of first transmission member 31 and second transmission member 32 is rotatably supported by frame body 100.

First transmission member 31 includes a first connection rod 31a extending in the Z-axis direction, a gear 31b fixed to one end of first connection rod 31a, and a gear 31c fixed to the other end of first connection rod 31a. Each of gear 31b and gear 31c rotates, together with first connection rod 31a, about the axis line of first connection rod 31a.

Second transmission member 32 includes a second connection rod 32a extending in the Z-axis direction, a gear 32b fixed to one end of second connection rod 32a, and a disk 32c fixed to the other end of second connection rod 32a. Each of gear 32b and disk 32c rotates, together with second connection rod 32a, about the axis line of second connection rod 32a.

Gear 31b fixed to one end of first connection rod 31a engages with gear 2b fixed to the end of output shaft 2a. Furthermore, gear 32b fixed to one end of second connection rod 32a engages with gear 31c fixed to the other end of first connection rod 31a.

Thus, the rotational motion produced in output shaft 2a of rotary motor 2 is transmitted, as rotational motion without being changed, to first transmission member 31 and second transmission member 32. Consequently, disk 32c serving as an output unit of rotational motion transmission unit 3A undergoes a rotational motion about the axis line of second connection rod 32a. Also, it should be appreciated that by adjusting the number of teeth of each of gears 31b, 31c and 32b, first transmission member 31 and second transmission member 32 are allowed to function as reduction gears.

In this case, each of first connection rod 31a of first transmission member 31 and second connection rod 32a of second transmission member 32 is formed of a rod made of carbon fiber in the exemplary aspect. Thereby, load fluctuation suppression units A1 and A2 described later (see FIG. 3) are formed by these first connection rod 31a and second connection rod 32a, respectively, which will be described later in detail.

Furthermore, the engagement portion between gear 2b of rotary motor 2 and gear 31b of first transmission member 31, and the engagement portion between gear 31c of first transmission member 31 and gear 32b of second transmission member 32 have respective backlashes of prescribed sizes. Thus, load fluctuation suppression units B1 and B2 described later (see FIG. 3) are formed by their respective engagement portions, which will be described later in detail.

As shown in FIGS. 1, 2 and 4, motion conversion unit 3B is disposed above rotary motor 2 and rotational motion transmission unit 3A, and mainly includes: a crank formed of a crank arm 33 and crank pins 34a and 34b; a slider 35; an elastic belt 36; a first rotating body 37; and a second rotating body 38.

Slider 35 is formed of a rectangular frame-shaped member, and located above second transmission member 32 of rotational motion transmission unit 3A. Slider 35 is movably supported by a pair of slide guides 5a and 5b provided in frame body 100. More specifically, the pair of slide guides 5a and 5b is provided such that slide guides 5a and 5b are arranged side by side in the Y-axis direction so as to extend in the X-axis direction. Slider 35 is provided at its prescribed positions with a plurality of through holes through which slide guides 5a and 5b are inserted. Thus, slider 35 is configured to be movable in the X-axis direction corresponding to the first direction by slide guides 5a and 5b inserted through the plurality of through holes.

Crank arm 33 is disposed below slider 35 and above second transmission member 32. Crank arm 33 is disposed so as to extend in the direction parallel with an X-Y plane. Crank arm 33 has one end that is rotatably attached by crank pin 34a at the eccentric position of disk 32c of second transmission member 32; and the other end that is rotatably attached by crank pin 34b at the prescribed position of slider 35.

Thereby, as shown in FIG. 4, disk 32c as an output unit of rotational motion transmission unit 3A undergoes a rotational motion about rotation axis 200 as the center of rotation, so that the one end of crank arm 33 attached at disk 32c (that is, the end of crank arm 33 on the side where crank pin 34a is located) also rotates about rotation axis 200 as the center of rotation. Accordingly, slider 35 is periodically pushed and pulled by crank arm 33, so that slider 35 linearly reciprocates in the X-axis direction corresponding to the direction in which slide guides 5a and 5b extend. In FIG. 4, the range in which the position of the center of gravity of slider 35 moves during linear reciprocation of slider 35 is indicated by an arrow AR1.

As shown in FIGS. 1 and 4, first rotating body 37 and second rotating body 38 are arranged on the right side and the left side, respectively, of slider 35. More specifically, first rotating body 37 and second rotating body 38 are arranged side by side with slider 35 interposed therebetween in the Y-axis direction corresponding to the third direction. Moreover, first rotating body 37 and second rotating body 38 each are formed of an approximately columnar-shaped member, and are arranged such that their circumferential surfaces face slider 35.

More specifically, first rotating body 37 is fixed to a guide shaft 6a provided in frame body 100 and extending in the Z-axis direction. Guide shaft 6a is rotatably supported by frame body 100. Thereby, as shown in FIG. 4, on the side of a right side surface 35a of slider 35, first rotating body 37 is positioned rotatably about a rotation axis 201 as the center of rotation, which extends in the Z-axis direction corresponding to the second direction.

Furthermore, second rotating body 38 is fixed to a guide shaft 6b provided in frame body 100 and extending in the Z-axis direction. Guide shaft 6b is rotatably supported by frame body 100. Thereby, as shown in FIG. 4, on the side of a left side surface 35b of slider 35, second rotating body 38 is positioned rotatably about a rotation axis 202 as the center of rotation, which extends in the Z-axis direction corresponding to the second direction.

In addition, the circumferential surface of each of first rotating body 37 and second rotating body 38 that faces slider 35 is provided with a gear groove so as to extend around each circumferential surface. The gear grooves are provided with teeth 37a and 38a, which respectively allow first rotating body 37 and second rotating body 38 to function also as gears.

Elastic belt 36 is wound around the outer circumferential surface of slider 35, the circumferential surface of first rotating body 37, and the circumferential surface of second rotating body 38. Elastic belt 36 is formed of a toothed belt having main surfaces, one of which is provided at its prescribed position with teeth 36a. Elastic belt 36 may be formed of any material as long as the material has elasticity, but is preferably formed of resin or rubber. In addition, elastic belt 36 needs to be designed based on the purpose of suppressing load fluctuation, which will be described later.

The portion of elastic belt 36 that is wound around the outer circumferential surface of slider 35 is fixed to slider 35 in an area of the outer circumferential surface of slider 35 excluding right side surface 35a and left side surface 35b as described above. Furthermore, the above-mentioned teeth 36a face outward in a portion of elastic belt 36 that is wound around the outer circumferential surface of slider 35.

The portions of elastic belt 36 that are wound around the outer circumferential surface of slider 35 and around the circumferential surface of first rotating body 37 are wound around slider 35 and first rotating body 37 so as to extend to form a figure of "8". In this case, in the portion of elastic belt 36 that is wound around the circumferential surface of first rotating body 37, teeth 36a face inward and engage with teeth 37a on the gear groove provided on the circumferential surface of first rotating body 37.

Furthermore, the portions of elastic belt 36 that are wound around the outer circumferential surface of slider 35 and around the circumferential surface of second rotating body 38 are wound around slider 35 and second rotating body 38 so as to extend to form a figure of "8". In this case, in the portion of elastic belt 36 that is wound around the circumferential surface of second rotating body 38, teeth 36a face inward and engage with teeth 38a of the gear groove provided on the circumferential surface of second rotating body 38.

Accordingly, on the side of right side surface 35a of slider 35, the portion of elastic belt 36 that is not fixed is wound around first rotating body 37. Also, on the side of left side surface 35b of slider 35, the portion of elastic belt 36 that is not fixed is wound around second rotating body 38.

Thus, as slider 35 linearly reciprocates in the X-axis direction as described above, the portions of elastic belt 36 that are wound around first rotating body 37 and second rotating body 38 are fed in their respective rotation directions of first rotating body 37 and second rotating body 38. This causes first rotating body 37 and second rotating body 38 to reciprocate in their respective rotation directions about the above-described rotation axes 201 and 202, respectively, each as the center of rotation. In this case, the rotation direction of first rotating body 37 and the rotation direction of second rotating body 38 are opposite to each other at all times.

Thus, in motion conversion unit 3B, the rotational motion transmitted through rotational motion transmission unit 3A is converted into a reciprocating motion, so that first rotating body 37 and second rotating body 38 each as an output unit of motion conversion unit 3B synchronously reciprocate in their respective rotation directions.

In this case, as described above, transmission of the motion between slider 35 and each of first rotating body 37 and second rotating body 38 is implemented by elastic belt 36. Thereby, load fluctuation suppression units C1 and C2 described later (see FIG. 4) are constituted by this elastic belt 36, which will be described later in detail.

As shown in FIGS. 1 and 4, first wing unit 4A and second wing unit 4B are attached to first rotating body 37 and second rotating body 38, respectively. More specifically, at a prescribed position on the circumferential surface of first rotating body 37 on the side opposite to the side where slider 35 is located, the proximal end as one end of a mast 4a of first wing unit 4A is fixed. Also, at a prescribed position on the circumferential surface of second rotating body 38 on the side opposite to the side where slider 35 is located, the proximal end as one end of a mast 4b of second wing unit 4B is fixed.

Thereby, on the starboard side of wing flapping apparatus 1A, first wing unit 4A extends in the Y1 direction such that its distal end is located on the side opposite to the side where second rotating body 38 is located, when seen from first rotating body 37. Also, on the port side of wing flapping apparatus 1A, second wing unit 4B extends in the Y2 direction such that its distal end is located on the side opposite to the side where first rotating body 37 is located, when seen from second rotating body 38.

Thus, as shown in FIG. 4, first rotating body 37 and second rotating body 38 each as an output unit of motion conversion unit 3B synchronously reciprocate in their respective rotation directions about rotation axes 201 and 202, respectively, each as the center of rotation, so that first wing unit 4A and second wing unit 4B are driven by first rotating body 37 and second rotating body 38, respectively, so as to synchronously swing.

In this case, first wing unit 4A and second wing unit 4B also synchronously reciprocate in their respective rotation directions about the above-described rotation axes 201 and 202, respectively, each as the center of rotation. Accordingly, first wing unit 4A and second wing unit 4B synchronously swing such that their respective distal ends move approximately in the X-axis direction corresponding to the first direction. In FIG. 4, the range in which each of first wing unit 4A and second wing unit 4B swings is indicated by an arrow AR2.

As described above, wing flapping apparatus 1A in the present embodiment is configured as follows. Specifically, the rotational motion generated by rotary motor 2 as a driving source is converted into a reciprocating motion when it is transmitted by power transmission mechanism 3. Then, upon reception of the transmitted reciprocating motion, first wing unit 4A and second wing unit 4B swing. Thereby, first wing unit 4A and second wing unit 4B synchronously swing, so that wing flapping apparatus 1A continuously flaps, thereby achieving levitation force.

In this case, as described above, in wing flapping apparatus 1A in the present embodiment, during the operation, first rotating body 37 and second rotating body 38 reciprocate in their respective rotation directions, thereby not only causing first wing unit 4A and second wing unit 4B to swing, but also causing slider 35 to linearly reciprocate. In this case, linear reciprocation of slider 35 and swinging of first wing unit 4A and second wing unit 4B are opposite in direction to each other at all times, which will be hereinafter described in detail.

FIGS. 5 to 8 each are a schematic top view for illustrating details of the operation of the motion conversion unit of the wing flapping apparatus in the above-described present embodiment. In this case, FIGS. 5 to 8 are diagrams illustrating an exemplary chronological order of how slider 35, first wing unit 4A and second wing unit 4B move in one cycle of the synchronous flapping operation of first wing unit 4A and second wing unit 4B, starting from the state of wing flapping apparatus 1A shown in FIG. 4.

Initially, in the state shown in FIG. 4, slider 35 is located approximately at the center position within the range in which slider 35 can linearly reciprocate. In this case, first wing unit 4A and second wing unit 4B are located at the position of three o'clock and the position of nine o'clock, respectively. Also, when first wing unit 4A and second wing unit 4B are seen from above in the Z2 direction, these first wing unit 4A and second wing unit 4B are located on the same straight line. In this case, the one end of crank arm 33 attached to disk 32c serving as a connection portion between rotational motion transmission unit 3A and motion conversion unit 3B (that is, the end of crank arm on the side where pin 34a is located) is located at the position of nine o'clock.

Figure 5:
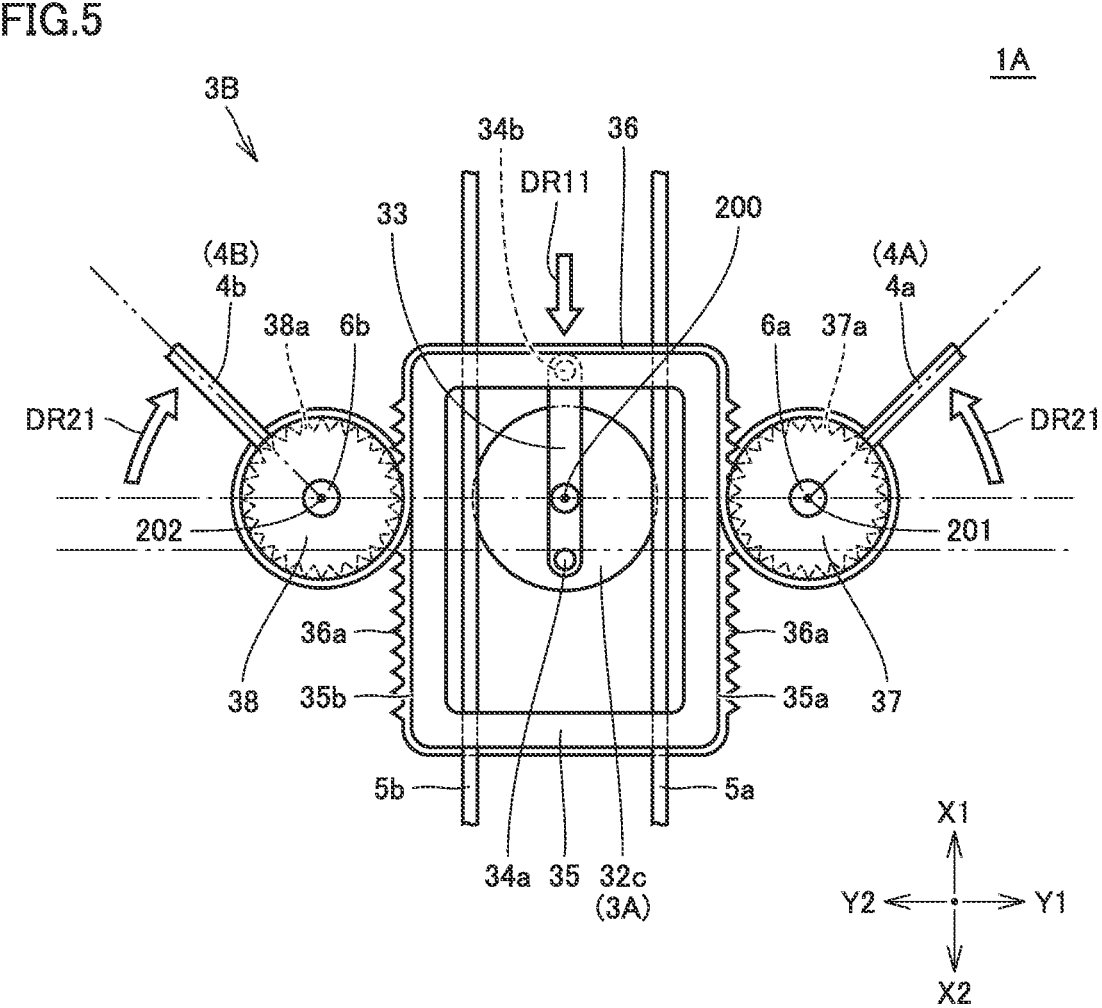
FIG. 5 is a schematic top view for illustrating details of the operation of the motion conversion unit of the wing flapping apparatus in the first exemplary embodiment.

First, as shown in FIG. 5, upon reception of the motive power transmitted from rotary motor 2, disk 32c rotates from the state shown in FIG. 4 by 90° in a counter-clockwise direction. Then, the above-mentioned connection portion reaches the position of six o'clock from the position of nine o'clock, during which slider 35 moves in a DR11 direction shown in the figure, which causes the position of the center of gravity of slider 35 also to move in the X2 direction.

Also in this case, first wing unit 4A and second wing unit 4B are moved in a DR21 direction shown in the figure (that is, toward the position of twelve o'clock) in accordance with the counter-clockwise rotation of first rotating body 37 and the clockwise rotation of second rotating body 38, respectively. It should be appreciated that such movements occur approximately in the X1 direction.

During such movements, the moving direction of slider 35 and the moving direction of each of first wing unit 4A and second wing unit 4B are opposite to each other approximately in the X-axis direction. Thus, the position of the center of gravity of slider 35 moves backward in the X2 direction, so that slider 35 acts as a counterweight. Thereby, the acceleration caused in accordance with the movement of each of first wing unit 4A and second wing unit 4B in the X1 direction is opposite in direction to the acceleration caused in accordance with the movement of slider 35 in the X2 direction, with the result that the inertial force is counteracted.

Figure 6:
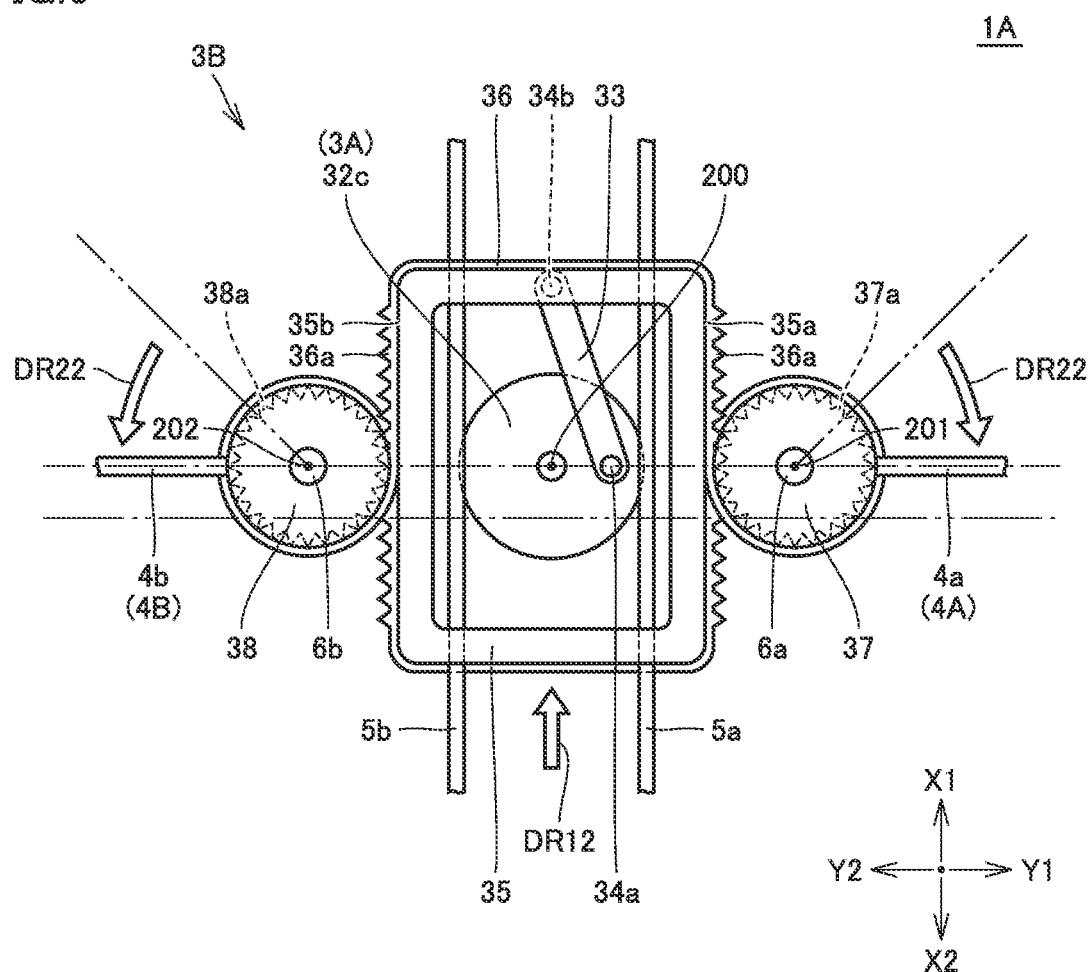
FIG. 6 is a schematic top view for illustrating details of the operation of the motion conversion unit of the wing flapping apparatus in the first exemplary embodiment.

Then, as shown in FIG. 6, upon reception of the motive power transmitted from rotary motor 2, disk 32c further rotates from the state shown in FIG. 5 by 90° in the counter-clockwise direction. Thereby, the above-mentioned connection portion reaches the position of three o'clock from the position of six o'clock, during which slider 35 moves in a DR12 direction shown in the figure, which causes the position of the center of gravity of slider 35 also to move in the X1 direction.

Also in this case, first wing unit 4A and second wing unit 4B are moved in a DR22 direction shown in the figure (that is, toward the position of three o'clock and the position of nine o'clock, respectively) in accordance with the clockwise rotation of first rotating body 37 and the counter-clockwise rotation of second rotating body 38, respectively. Such movements occur approximately in the X2 direction.

Accordingly, also during such movements, the moving direction of slider 35 and the moving direction of each of first wing unit 4A and second wing unit 4B are opposite to each other approximately in the X-axis direction. Thus, the position of the center of gravity of slider 35 moves forward in the X1 direction, so that slider 35 acts as a counterweight. Thereby, the acceleration caused in accordance with the movement of each of first wing unit 4A and second wing unit 4B in the X2 direction is opposite in direction to the acceleration caused in accordance with the movement of slider 35 in the X1 direction, with the result that the inertial force is counteracted.

Figure 7:
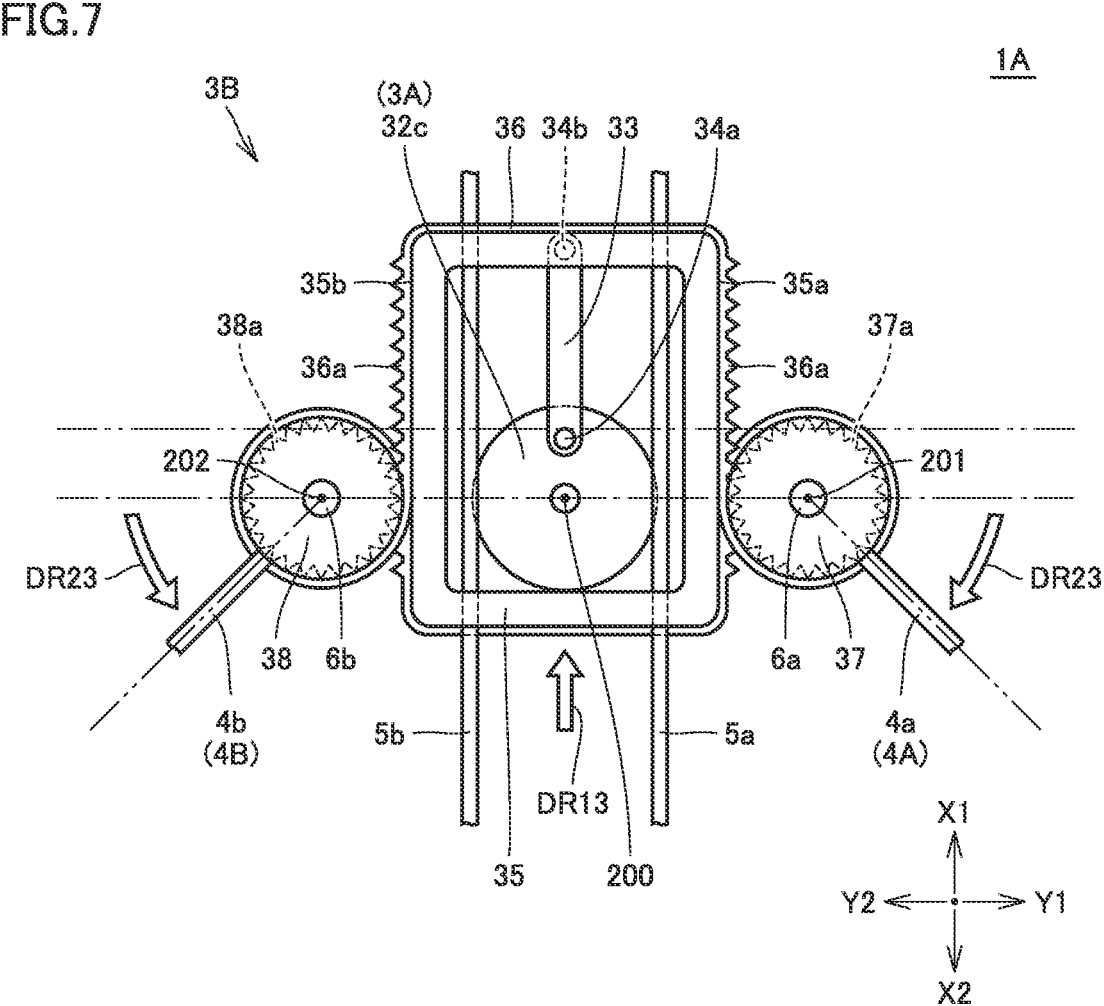
FIG. 7 is a schematic top view for illustrating details of the operation of the motion conversion unit of the wing flapping apparatus in the first exemplary embodiment.

Then, as shown in FIG. 7, upon reception of the motive power transmitted from rotary motor 2, disk 32c further rotates from the state shown in FIG. 6 by 90° in the counter-clockwise direction. Then, the above-mentioned connection portion reaches the position of twelve o'clock from the position of three o'clock, during which slider 35 moves in a DR13 direction shown in the figure, which causes the position of the center of gravity of slider 35 also to move in the X1 direction.

Also in this case, first wing unit 4A and second wing unit 4B are moved in a DR23 direction shown in the figure (that is, toward the position of six o'clock) in accordance with the clockwise rotation of first rotating body 37 and the counter-clockwise rotation of second rotating body 38, respectively. As can further be seen, such movements occur approximately in the X2 direction.

Also during such movements, the moving direction of slider 35 and the moving direction of each of first wing unit 4A and second wing unit 4B are opposite to each other approximately in the X-axis direction. Thus, the position of the center of gravity of slider 35 moves forward in the X1 direction, so that slider 35 acts as a counterweight. Thereby, the acceleration caused in accordance with the movement of each of first wing unit 4A and second wing unit 4B in the X2 direction is opposite in direction to the acceleration caused in accordance with the movement of slider 35 in the X1 direction, with the result that the inertial force is counteracted.

Figure 8:
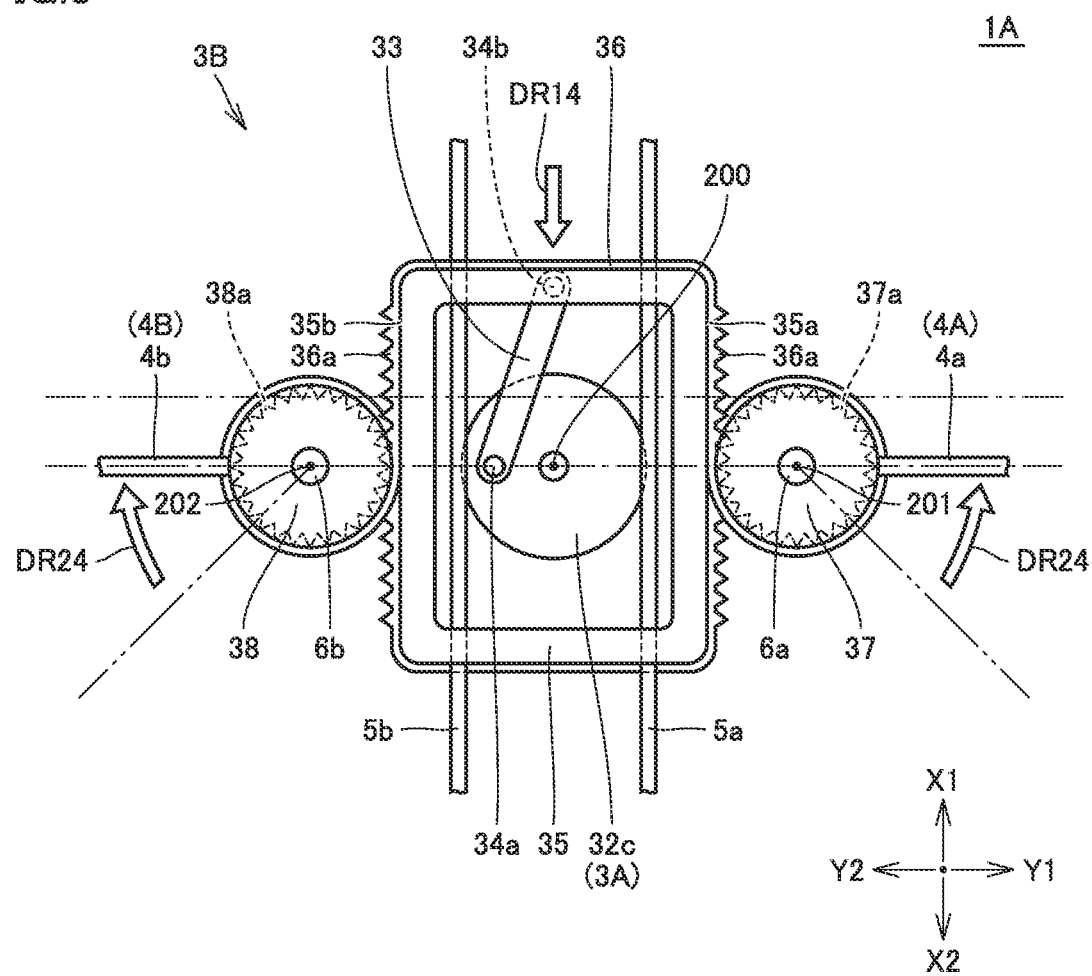
FIG. 8 is a schematic top view for illustrating details of the operation of the motion conversion unit of the wing flapping apparatus in the first exemplary embodiment.

Then, as shown in FIG. 8, upon reception of the motive power transmitted from rotary motor 2, disk 32c further rotates from the state shown in FIG. 7 by 90° in the counter-clockwise direction. Then, the above-mentioned connection portion reaches the position of three o'clock from the position of twelve o'clock, during which slider 35 moves in a DR14 direction shown in the figure, which causes the position of the center of gravity of slider 35 also to move in the X2 direction.

Also in this case, first wing unit 4A and second wing unit 4B are moved in a DR24 direction shown in the figure (that is, toward the position of three o'clock and the position of nine o'clock, respectively) in accordance with the counter-clockwise rotation of first rotating body 37 and the clockwise rotation of second rotating body 38, respectively. Such movements occur approximately in the X1 direction.

Accordingly, also during such movements, the moving direction of slider 35 and the moving direction of each of first wing unit 4A and second wing unit 4B are opposite to each other approximately in the X-axis direction. Thus, the position of the center of gravity of slider 35 moves backward in the X2 direction, so that slider 35 acts as a counterweight. Thereby, the acceleration caused in accordance with the movement of each of first wing unit 4A and second wing unit 4B in the X1 direction is opposite in direction to the acceleration caused in accordance with the movement of slider 35 in the X2 direction, with the result that the inertial force is counteracted.

As described above, in wing flapping apparatus 1A in the present embodiment, during the operation, linear reciprocation of slider 35 and swinging of each of first wing unit 4A and second wing unit 4B are opposite in direction to each other at all times.

Accordingly, slider 35 acts as a counterweight, so that the inertial force caused by swinging of first wing unit 4A and second wing unit 4B is counteracted at all times, thereby suppressing occurrence of periodical vibrations in frame body 100, with the result that the attitude of wing flapping apparatus 1A is stabilized.

Also, at the same time, first wing unit 4A and second wing unit 4B smoothly swing, so that fluctuations of the load applied to output shaft 2a of rotary motor 2 as a motive power source can be significantly suppressed.

Accordingly, by employing the above-described configuration, the motion efficiency is significantly improved as compared with the conventional wing flapping designs, so that a wing flapping apparatus excellent in flight ability can be achieved according to the exemplary aspects.

The present embodiment provides an example of the configuration in which, in the state where first wing unit 4A and second wing unit 4B are arranged at the position of three o'clock and the position of nine o'clock, respectively, one end of crank arm 33 that is connected to disk 32c (that is, the end of crank arm 33 on the side where crank pin 34a is located) is located at the position of three o'clock or nine o'clock with respect to rotation axis 200 of disk 32c. In this case, however, there is a difference between the forward swinging range and the rearward swinging range of each of first wing unit 4A and second wing unit 4B. Accordingly, in order to set the forward swinging range and the rearward swinging range of each of first and second wing units 4A and 4B to be the same, the length of crank arm 33 may be appropriately adjusted such that, in the state where first wing unit 4A and second wing unit 4B are arranged at the position of three o'clock and the position of nine o'clock, respectively, the above-mentioned one end of crank arm 33 is disposed on the forward side relative to rotation axis 200 of disk 32c (that is, on the side of two o'clock when seen from the position of three o'clock and on the side of ten o'clock when seen from the position of nine o'clock).

Also, as described above, in wing flapping apparatus 1A in the present embodiment, power transmission mechanism 3 is provided with a plurality of load fluctuation suppression units A1, A2, B1, B2, C1, and C2. Each of load fluctuation suppression units A1, A2, B1, B2, C1, and C2 serves to suppress fluctuations of the load that is to be transmitted to output shaft 2a of rotary motor 2 through power transmission mechanism 3, the load being generated when first wing unit 4A and second wing unit 4B receive air resistance during swinging of first wing unit 4A and second wing unit 4B. The details of load fluctuation suppression units A1, A2, B1, B2, C1, and C2 will be hereinafter described in detail.

Referring back to FIG. 3, load fluctuation suppression units A1 and A2 are formed by first connection rod 31a of first transmission member 31 and second connection rod 32a of second transmission member 32, respectively. In this case, as described above, each of first connection rod 31a and second connection rod 32a is made of carbon fiber, and thus, is more likely to be twisted than metal-made output shaft 2a of rotary motor 2. More specifically, each of first connection rod 31a and second connection rod 32a is formed, for example, of carbon fiber reinforced plastic (CFRP) that has a fiber orientation in the axis direction of each rod, so as to be prepared as a member having proper elasticity against twisting and also having proper rigidity against flexure. Accordingly, first connection rod 31a and second connection rod 32a are twisted during transmission of the load as described above, so that first connection rod 31a and second connection rod 32a can absorb fluctuations of this load to a considerable degree.

In this case, when first connection rod 31a and second connection rod 32a are more likely to be twisted, these first connection rod 31a and second connection rod 32a receive fluctuations of the load to thereby cause a slight phase shift in transmission of the rotational motion. However, if this phase shift is sufficiently small, this sufficiently small phase shift does not cause a large loss in transmission of the motion, but the effect of absorbing fluctuations of the load as described above is remarkably achieved.

Accordingly, fluctuations of the load transmitted to output shaft 2a of rotary motor 2 through power transmission mechanism 3 from first wing unit 4A and second wing unit 4B in accordance with swinging of first wing unit 4A and second wing unit 4B are absorbed by load fluctuation suppression units A1 and A2, and thereby equalized. Therefore, fluctuations of the load applied to output shaft 2a of rotary motor 2 can be significantly suppressed.

Also as shown in FIG. 3, load fluctuation suppression unit B1 is formed of an engagement portion between gear 2b of rotary motor 2 and gear 31b of first transmission member 31 while load fluctuation suppression unit B2 is formed of an engagement portion between gear 31c of first transmission member 31 and gear 32b of second transmission member 32. In this case, as described above, each of these engagement portions has a gap of a prescribed size, that is, a so-called backlash. In other words, since each of these engagement portions has a sufficient backlash, fluctuations of the load can be absorbed to a considerable degree due to existence of this backlash during the above-described transmission of the load.

In this case, when each of these engagement portions has an unnecessarily large backlash, a loss may occur in transmission of the motion, and the useful life of each gear may be shortened. However, when the size of this backlash is optimized, transmission of the motion and the useful life of each gear are not significantly influenced thereby, but the effect of absorbing fluctuations of the load described above is remarkably achieved.

Thus, fluctuations of the load transmitted to output shaft 2a of rotary motor 2 through power transmission mechanism 3 from first wing unit 4A and second wing unit 4B in accordance with swinging of first wing unit 4A and second wing unit 4B are absorbed by load fluctuation suppression units B1 and B2, and thereby equalized. Therefore, fluctuations of the load applied to output shaft 2a of rotary motor 2 can be significantly suppressed. In addition, it is preferable that the amount of the above-described backlash is set as large as possible within the range in which transmission of the rotational motion between the gears is not prevented.

Furthermore, as shown in FIG. 4, each of load fluctuation suppression units C1 and C2 is formed by elastic belt 36. In this case, as described above, elastic belt 36 exhibits excellent elasticity. Accordingly, when the above-mentioned load is transmitted from first rotating body 37 and second rotating body 38 to slider 35, elastic belt 36 is elastically deformed (mainly extended), so that fluctuations of this load can be absorbed to a considerable degree.

In this case, elastic belt 36 is used to thereby cause a slight transmission delay to occur during transmission of the motion. However, when the transmission delay is sufficiently small, this sufficiently small transmission delay does not cause a large loss in transmission of the motion, but the effect of absorbing fluctuations of the load described above is remarkably achieved.

Accordingly, fluctuations of the load transmitted to output shaft 2a of rotary motor 2 through power transmission mechanism 3 from first wing unit 4A and second wing unit 4B in accordance with swinging of first wing unit 4A and second wing unit 4B are absorbed by load fluctuation suppression units C1 and C2, and thereby equalized. Therefore, fluctuations of the load applied to output shaft 2a of rotary motor 2 can be significantly suppressed.

As described above, in wing flapping apparatus 1A in the present embodiment, fluctuations of the load that is to be transmitted from first wing unit 4A and second wing unit 4B to output shaft 2a of rotary motor 2 through power transmission mechanism 3 can be significantly suppressed by load fluctuation suppression units A1, A2, B1, B2, C1, and C2 provided in power transmission mechanism 3. Accordingly, the motion efficiency is significantly improved as compared with the conventional case, so that a wing flapping apparatus excellent in flight ability can be achieved.

The present embodiment has been described with reference to an example in which first connection rod 31a and second connection rod 32a each formed of a member that is more likely to be twisted than metal-made output shafts 2a of rotary motor 2 are used as load fluctuation suppression units A1 and A2, respectively. Alternatively, first connection rod 31a and second connection rod 32a each formed of a member that is more likely to undergo flexure than metal-made output shaft 2a of rotary motor 2 can be used as load fluctuation suppression units A1 and A2, respectively, as should be appreciated to one skilled in the art.

More specifically, each of first connection rod 31a and second connection rod 32a is formed by a member that is rendered relatively readily flexure-deformable, for example, by subjecting a hardly-deformable metal-made member to shape-machining (by way of example, shape-machining for cutting a slit on the surface of a metal-made rod) or the like. Thereby, each of first connection rod 31a and second connection rod 32a can be formed as a member having proper elasticity against flexure and also having proper rigidity against twisting. Accordingly, when each of first connection rod 31a and second connection rod 32a is formed of such a member, these first connection rod 31a and second connection rod 32a undergo flexure during the above-described transmission of the load, so that fluctuations of this load can be absorbed to a considerable degree.

In this case, when first connection rod 31a and second connection rod 32a are more likely to undergo flexure, these first connection rod 31a and second connection rod 32a receive fluctuations of the load, thereby causing a slight axial misalignment. However, when this axial misalignment is sufficiently small, this sufficient small axial misalignment does not cause a large loss in transmission of the motion, but the effect of absorbing fluctuations of the load as described above is remarkably achieved.

Accordingly, fluctuations of the load transmitted to output shaft 2a of rotary motor 2 through power transmission mechanism 3 from first wing unit 4A and second wing unit 4B in accordance with swinging of first wing unit 4A and second wing unit 4B are absorbed by load fluctuation suppression units A1 and A2, and thereby equalized. Therefore, fluctuations of the load applied to output shaft 2a of rotary motor 2 can be significantly suppressed.

Furthermore, each of first connection rod 31a and second connection rod 32a can also be formed of a member that is more likely to undergo twisting and flexure than metal-made output shaft 2a of rotary motor 2. In this case, each of first connection rod 31a and second connection rod 32a may be formed of: a member made of resin or rubber; a member made of relatively readily deformable metal; a member that is rendered relatively readily deformable by subjecting a hardly-deformable metal-made member to shape-machining and the like (for example, a spring-shaped member); or the like. Also in the configuration formed in this way, fluctuations of the load applied to output shaft 2a of rotary motor 2 can be significantly suppressed.

In addition, in wing flapping apparatus 1A in the present embodiment, a plurality of load fluctuation suppression units A1, A2, B1, B2, C1, and C2 are provided. However, as long as at least one of load fluctuation suppression units A1, A2, B1, B2, C1, and C2 is provided in power transmission mechanism 3, the motion efficiency is improved to a considerable degree. For example, in the above-described present embodiment, only one of first connection rod 31a and second connection rod 32a may be formed of carbon fiber reinforced plastic.

Figure 9:
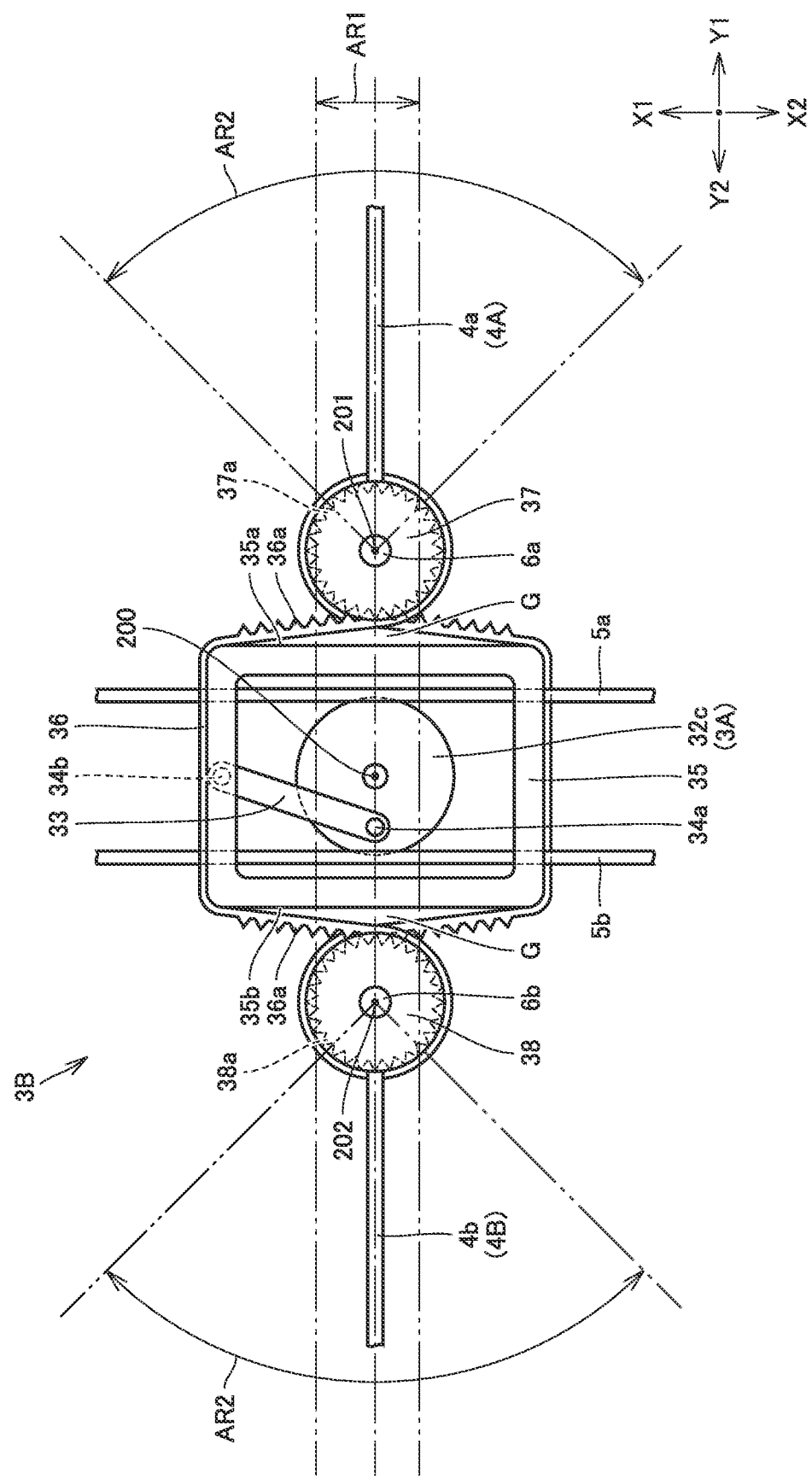
FIG. 9 is a schematic top view for illustrating the configuration and the operation of a motion conversion unit of a wing flapping apparatus in a modification according to the first exemplary embodiment.

FIG. 9 is a schematic top view for illustrating the configuration and the operation of a motion conversion unit of a wing flapping apparatus in a modification according to the above-described embodiment of the present disclosure. Since the operation of the wing flapping apparatus according to the present modification is the same as that in the above-described embodiment, the description thereof will not be hereinafter repeated.

As shown in FIG. 9, in a wing flapping apparatus 1A1 according to the present modification, the distance between slider 35 and each of first rotating body 37 and second rotating body 38 is adjusted, thereby forming a gap G between a portion of elastic belt 36 that is wound around slider 35 and each of right side surface 35a and left side surface 35b of slider 35.

In the configuration formed in this way, elastic belt 36 is more likely to undergo deformation such as expansion and contraction by the amount corresponding to gap G. Also, this deformation such as expansion and contraction is not inhibited by slider 35, first rotating body 37 and second rotating body 38. Accordingly, fluctuations of the load as described above can be more remarkably absorbed. Therefore, the motion efficiency is further significantly improved, so that a wing flapping apparatus particularly excellent in flight ability can be achieved.

Also, it is preferable that gap G is formed such that the distance between slider 35 and each of the portion of elastic belt 36 that engages with first rotating body 37 and the portion of elastic belt 36 that engages with second rotating body 38 is greater than the thickness of elastic belt 36.

Second Embodiment

Figure 10:
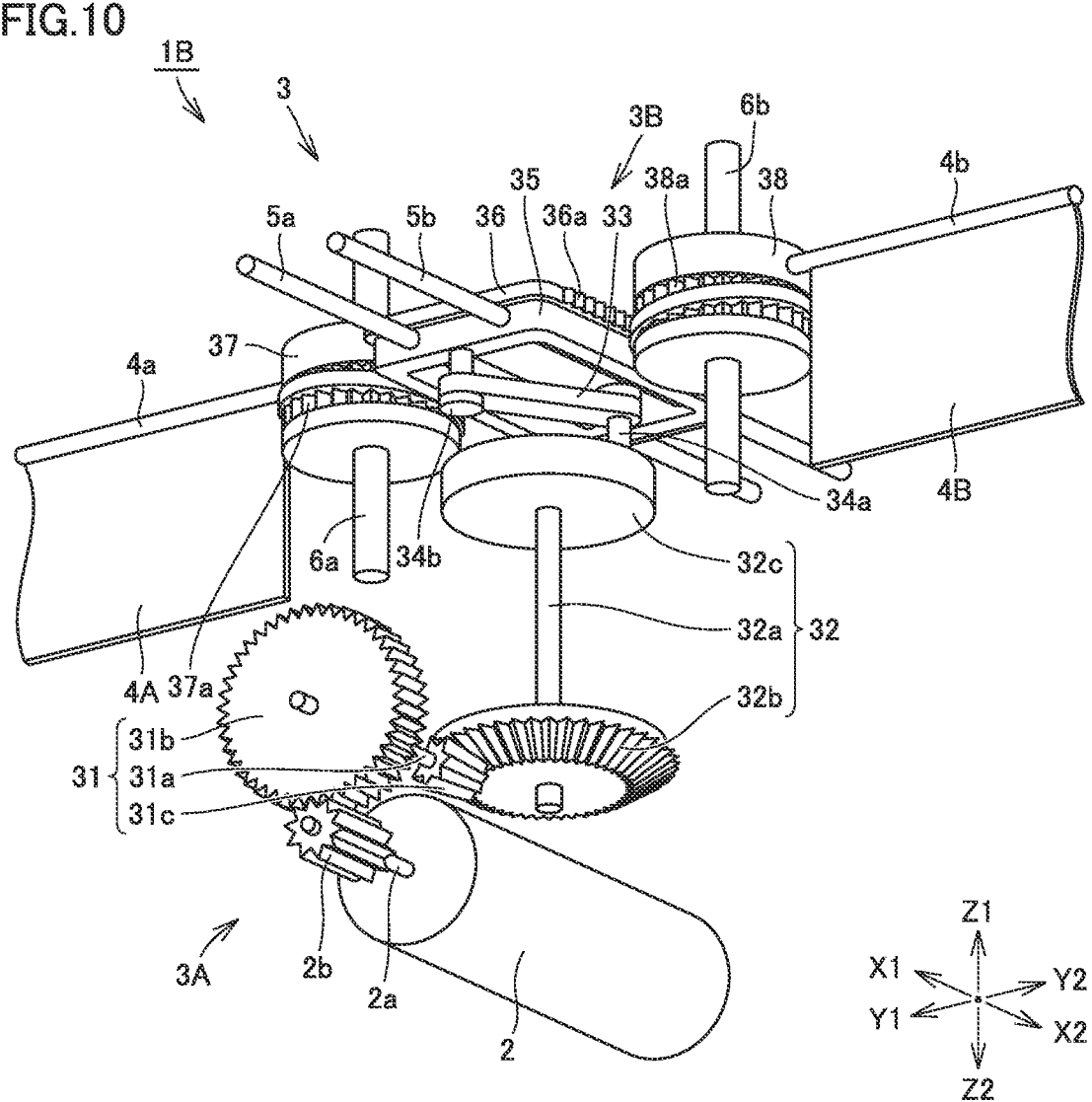
FIG. 10 is a schematic perspective view of a main part of a wing flapping apparatus in the second exemplary embodiment.

FIG. 10 is a schematic perspective view of a main part of a wing flapping apparatus in the second exemplary embodiment. In the following, a wing flapping apparatus 1B in the second exemplary embodiment will be described with reference to FIG. 10.

As shown in FIG. 10, as compared with wing flapping apparatus 1A in the above-described first embodiment, wing flapping apparatus 1B in the present embodiment is different only in layout of rotary motor 2 as a driving source and in configuration of rotational motion transmission unit 3A of power transmission mechanism 3.

Specifically, rotary motor 2 is arranged in the lower portion of wing flapping apparatus 1A such that its output shaft 2a extends in the X-axis direction. According to this arrangement, first transmission member 31 is arranged such that first connection rod 31a extends in the X-axis direction. Also, gear 32b fixed to one end of second connection rod 32a is formed of a bevel gear. Thereby, the rotational motion of first transmission member 31 about the X-axis is converted into a rotational motion of second transmission member 32 about the Z-axis, and then transmitted.

Also in the configuration formed in this way, the effect similar to the effect that has been explained in the above-described first embodiment can be achieved, so that a wing flapping apparatus improved in motion efficiency and excellent in flight ability can be achieved.

In addition, the configuration of rotational motion transmission unit 3A is not limited to the configuration as in the above-described first embodiment or the configuration as in the present embodiment, but can be variously modified.

Third Embodiment

Figure 11:
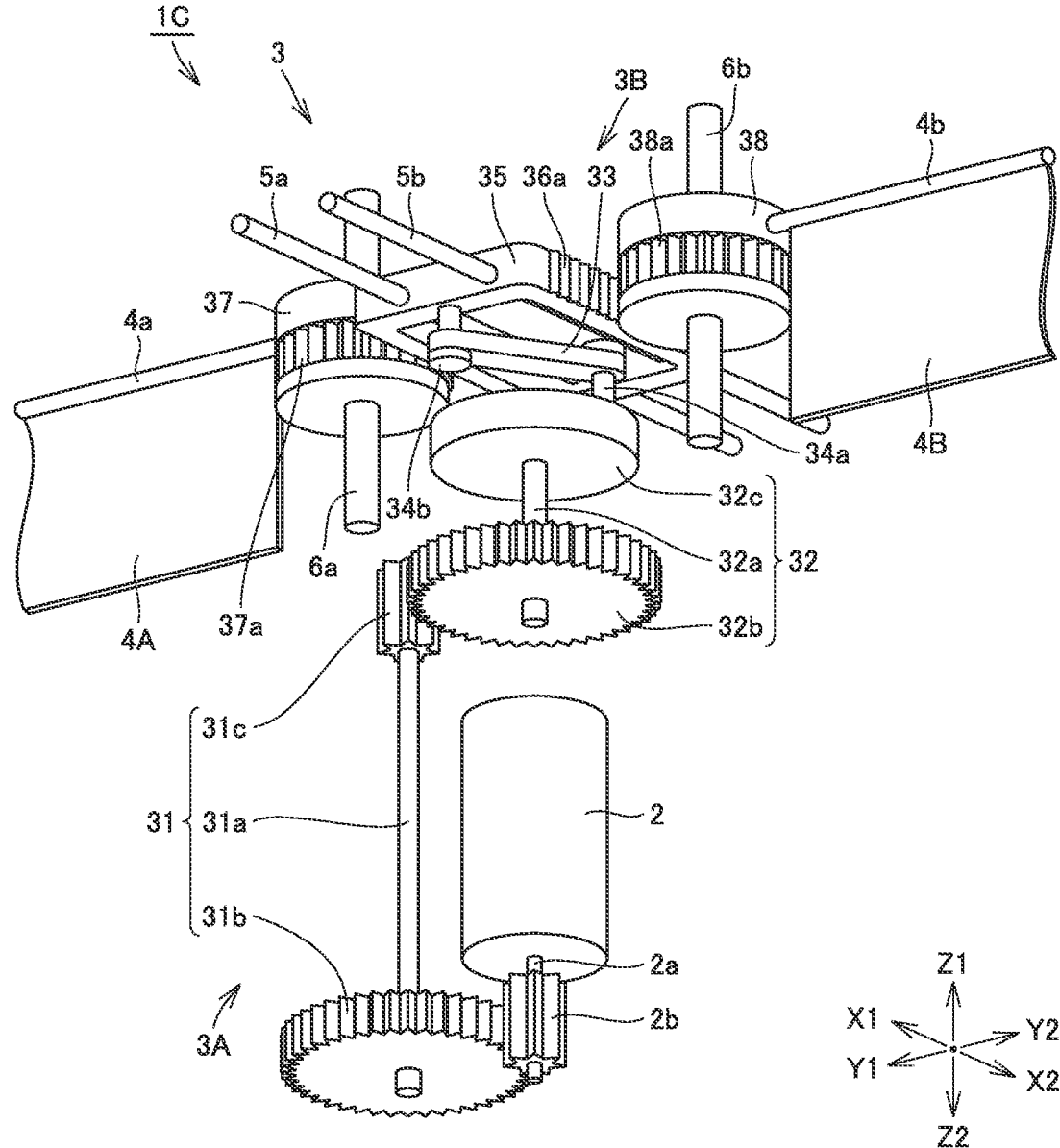
FIG. 11 is a schematic perspective view of a main part of a wing flapping apparatus in the third exemplary embodiment.

FIG. 11 is a schematic perspective view of a main part of a wing flapping apparatus in the third exemplary embodiment. FIG. 12 is a schematic top view for illustrating the configuration and the operation of the motion conversion unit shown in FIG. 11. In the following, a wing flapping apparatus 1C in the third exemplary embodiment will be described with reference to these FIGS. 11 and 12.

As shown in FIGS. 11 and 12, wing flapping apparatus 1C in the present embodiment is different only in the configuration of motion conversion unit 3B of power transmission mechanism 3, as compared with wing flapping apparatus 1A in the above-described first embodiment.

Specifically, motion conversion unit 3B mainly includes a crank formed of crank arm 33 and crank pins 34a and 34b; slider 35; first rotating body 37; and second rotating body 38, but does not include elastic belt 36 as shown in the above-described first embodiment. In this case, slider 35 is formed as a toothed slider. More specifically, teeth 35c are provided on each of right side surface 35a and left side surface 35b of slider 35.

First rotating body 37 and second rotating body 38 are arranged such that their respective circumferential surfaces contact right side surface 35a and left side surface 35b, respectively, of slider 35. Thereby, teeth 35c provided on right side surface 35a of slider 35 engage with teeth 37a of the gear groove provided on the circumferential surface of first rotating body 37 while teeth 35c provided on left side surface 35b of slider 35 engage with teeth 38a of the gear groove provided on the circumferential surface of second rotating body 38.

In other words, in wing flapping apparatus 1C in the present embodiment, the motion transmission between slider 35 and each of first rotating body 37 and second rotating body 38 is implemented by a so-called rack-and-pinion mechanism, in which slider 35 formed of a toothed slider engages with each of first rotating body 37 and second rotating body 38 each formed of a gear, thereby implementing motion transmission therebetween.

In this case, as shown in FIG. 12, in accordance with reciprocating linear motion of slider 35 in the X-axis direction, first rotating body 37 and second rotating body 38 reciprocate in their respective rotation directions about rotation axes 201 and 202, respectively, each as the center of rotation. In addition, the rotation direction of first rotating body 37 and the rotation direction of second rotating body 38 are opposite to each other at all times.

Thereby, when first rotating body 37 and second rotating body 38 serving as output units of motion conversion unit 3B synchronously reciprocate in their respective rotation directions about their respective rotation axes 201 and 202 each as the center of rotation, first wing unit 4A and second wing unit 4B are driven by first rotating body 37 and second rotating body 38, respectively, so as to synchronously swing.

In this case, although not described herein in detail, as in the above-described first embodiment, linear reciprocation of slider 35 and swinging of each of first wing unit 4A and second wing unit 4B are opposite in direction to each other at all times, so that slider 35 acts as a counterweight. Thereby, the inertial force caused by swinging of first wing unit 4A and second wing unit 4B is counteracted at all times.

Accordingly, also in the configuration formed in this way, the effect similar to the effect as explained in the above-described first embodiment can be achieved, so that a wing flapping apparatus improved in motion efficiency and excellent in flight ability can be achieved.

In the first to third exemplary embodiments and the modification of the first exemplary embodiment as described above, an explanation has been given with reference to an example of the configuration in which the motive power generated in a single motive power source is distributed by a power transmission mechanism, so that the wing unit provided on the starboard side of the frame body and the wing unit provided on the port side of the frame body are simultaneously driven. However, there may be a configuration in which the wing unit provided on the starboard side of the frame body and the wing unit provided on the port side of the frame body are driven separately by independently provided driving sources.

Moreover, in the first to third exemplary embodiments and the modification of the first exemplary embodiment as described above, an explanation has been given with reference to an example in which one wing unit is provided on each of the starboard side and the port side of the frame body, but a plurality of wing units may be provided on each of the starboard side and the port side of the frame body.

Furthermore, in the first and second exemplary embodiments and the modification of the first exemplary embodiment as described above, an explanation has been given with reference to an example in which an annular (that is, endless) elastic belt formed of a single member is wound around the slider, the first rotating body and the second rotating body. Alternatively, a non-annular elastic belt having an end may be employed instead. Also alternatively, an elastic belt wound around only the slider and the first rotating body, and an elastic belt wound around only the slider and the second rotating body may be employed instead.

Furthermore, in the first and second exemplary embodiments and the modification of the first exemplary embodiment as described above, an explanation has been given with reference to an example in which each of the first rotating body and the second rotating body is formed of a gear while the elastic belt is formed of a toothed belt. However, each of the first rotating body and the second rotating body may be formed of a friction roller with no teeth while the elastic belt may be formed of a friction belt with no teeth.

Furthermore, in the third exemplary embodiment as described above, an explanation has been given with reference to an example in which each of the first rotating body and the second rotating body is formed of a gear while the slider is formed of a slider with teeth. However, each of the first rotating body and the second rotating body may be formed of a friction roller with no teeth while the slider may be formed of a friction slider with no teeth.

Furthermore, the specific configuration of the motive power source and the specific configuration of the power transmission mechanism can be modified as appropriate within the scope not deviating from the subject of the present invention. Also, the characteristic configuration disclosed in the above-described embodiments can be combined with each other within the scope not deviating from the subject of the present invention.

Thus, the above-described embodiments and the modification thereof disclosed herein are illustrative and non-restrictive in every respect. The technical scope of the present invention is defined by the terms of the claims, and is intended to include any modifications within the meaning and scope equivalent to the terms of the claims.

REFERENCE SIGNS LIST 1A, 1A1, 1B, 1C wing flapping apparatus, 2A rotary motor, 2a output shaft, 2b gear, 3 power transmission mechanism, 3A rotational motion transmission unit, 3B motion conversion unit, 31 first transmission member, 31a first connection rod, 31b, 31c gear, 32 second transmission member, 32a second connection rod, 32b gear, 32c disk, 33 crank arm, 34a, 34b crank pin, 35 slider, 35a right side surface, 35b left side surface, 35c teeth, 36 elastic belt, 36a teeth, 37 first rotating body, 37a teeth, 38 second rotating body, 38a teeth, 4A first wing unit, 4B second wing unit, 4a, 4b mast, 5a, 5b slide guide, 6a, 6b guide shaft, 100 frame body, 200 to 202 rotation axis, A1, A2, B1, B2, C1, C2 load fluctuation suppression unit, G gap.

The invention claimed is:

1. A wing flapping apparatus comprising:
a frame body;
a motive power source disposed in the frame body;
a wing unit having a proximal end and a distal end; and
a power transmission mechanism configured to transmit motive power generated by the motive power source to the wing unit to drive the wing unit, the power transmission mechanism including:
a slider movably supported by the frame body and configured to linearly reciprocate in a first direction in response to the motive power received from the motive power source, wherein linear reciprocation of the slider and a swinging direction of the wing unit in the first direction are opposite to each other and wherein the power transmission mechanism further includes an elastic belt partially fixed to the slider, and
a rotating body rotatably supported by the frame body and configured to reciprocate in a rotation direction about a rotation axis as a center of rotation in response to the motive power transmitted from the slider, the rotation axis extending in a second direction that is orthogonal to the first direction,
wherein the rotating body comprises a gear, and the elastic belt comprises a toothed belt configured to engage with the gear, and
wherein the proximal end of the wing unit is fixed to the rotating body, such that the wing unit is configured to swing such that the distal end moves approximately in the first direction as the rotating body reciprocates in the rotation direction.

2. The wing flapping apparatus according to claim 1, wherein a portion of the elastic belt that is not fixed to the slider is wound around the rotating body, such that the rotating body is configured to reciprocate in the rotation direction as the slider linearly reciprocates.

3. The wing flapping apparatus according to claim 2, wherein the slider is located at a distance from the rotating body to provide a gap in a portion between the slider and a portion of the elastic belt that is wound around the slider.

4. The wing flapping apparatus according to claim 1, further comprising a rotatable disc coupled to the slider by a crank arm and configured to rotate in the rotation direction.

5. The wing flapping apparatus according to claim 4, wherein the motive power source is configured to rotate the rotatable disc in the rotation direction causing the crank arm to drive the slider to linearly reciprocate in the first direction.

6. A wing flapping apparatus comprising:
a frame body;
a motive power source disposed in the frame body;
a first wing unit and a second wing unit each having a proximal end and a distal end; and
a power transmission mechanism configured to transmit motive power generated by the motive power source to drive the first wing unit and the second wing unit, the power transmission mechanism including:
a slider movably supported by the frame body and configured to linearly reciprocate in a first direction in response to the motive power received from the motive power source, wherein movement of the slider in the first direction and a swinging direction of each of the first and second wing units in the first direction are opposite to each other and wherein the power transmission mechanism further includes an elastic belt partially fixed to the slider, and
first and second rotating bodies that are rotatably supported by the frame body and each configured to reciprocate in a rotation direction about a rotation axis as a center of rotation in response to the motive power transmitted from the slider, the rotation axis extending in a second direction that is orthogonal to the first direction,
wherein each of the first and second rotating bodies comprises a gear, and the elastic belt comprises a toothed belt configured to engage with each respective gear,
wherein the first rotating body and the second rotating body are arranged side by side in a third direction that is orthogonal to the first direction and the second direction,
wherein the proximal end of the first wing unit is fixed to the first rotating body such that the distal end is located on a side opposite to the second rotating body relative to the first rotating body,
wherein the proximal end of the second wing unit is fixed to the second rotating body such that the distal end is located on a side opposite to the first rotating body relative to the second rotating body, and
wherein the first and second wing units are each configured to swing such that the distal end of each of the first and second wing units synchronously move in the first direction as the first and second rotating bodies reciprocate in the rotation direction, respectively.

7. The wing flapping apparatus according to claim 6, wherein at least one portion of the elastic belt that is not fixed to the slider is wound around each of the first and second rotating bodies, such that the first and second rotating bodies are configured to reciprocate in the rotation direction as the slider linearly reciprocates.

8. The wing flapping apparatus according to claim 7, wherein the slider is located at a distance from the rotating body to provide a gap in a portion between the slider and a portion of the elastic belt that is wound around the slider.

9. The wing flapping apparatus according to claim 6, further comprising a rotatable disc coupled to the slider by a crank arm and configured to rotate in the rotation direction.

10. The wing flapping apparatus according to claim 9, wherein the motive power source is configured to rotate the rotatable disc in the rotation direction causing the crank arm to drive the slider to linearly reciprocate in the first direction.

11. An apparatus comprising:
a frame body;
at least one wing unit having a proximal end and a distal end; and a power transmission mechanism coupled to the frame body and configured to drive the at least one wing unit, the power transmission mechanism including:
- a slider movably supported by the frame body and configured to linearly reciprocate in a first direction, and
- at least one rotating body rotatably supported by the frame body and configured to reciprocate in a rotation direction that extends in a second direction that is orthogonal to the first direction, wherein the power transmission mechanism further includes an elastic belt partially fixed to the slider, and wherein a portion of the elastic belt that is not fixed to the slider is wound around the at least one rotating body, such that the at least one rotating body is configured to reciprocate in the rotation direction as the slider linearly reciprocates, wherein the at least one rotating body comprises a gear, and the elastic belt comprises a toothed belt configured to engage with the gear, wherein the proximal end of the at least one wing unit is fixed to the at least one rotating body, respectively, such that the distal end of the at least one wing unit moves in the first direction as the at least one rotating body reciprocates in the rotation direction, and wherein linear reciprocation of the slider and swinging of the at least one wing unit are in respective directions opposite to each other.

12. The apparatus according to claim 11, wherein the slider is located at a distance from the at least one rotating body to provide a gap in a portion between the slider and a portion of the elastic belt that is wound around the slider.

* * * * *